United States Patent [19]
Aoki

[11] Patent Number: 5,805,199
[45] Date of Patent: Sep. 8, 1998

[54] MULTI-BEAM WRITE OPTICAL SYSTEM

[75] Inventor: Magane Aoki, Yokosuka, Japan

[73] Assignee: Ricoh Company, Ltd., Tokyo, Japan

[21] Appl. No.: 835,024

[22] Filed: Mar. 27, 1997

[30] Foreign Application Priority Data

Apr. 3, 1996 [JP] Japan ................................. 8-108502

[51] Int. Cl.$^6$ ........................................................ B41J 2/47
[52] U.S. Cl. ........................... 347/256; 347/259; 359/204
[58] Field of Search ................................. 347/256, 259, 347/243, 244, 258, 260, 238, 239, 241; 359/204, 217

[56]  References Cited

U.S. PATENT DOCUMENTS

| | | | |
|---|---|---|---|
| 5,371,526 | 12/1994 | Appel et al. | 347/239 |
| 5,475,415 | 12/1995 | Noethen | 347/238 |
| 5,512,949 | 4/1996 | Fisli et al. | |

FOREIGN PATENT DOCUMENTS

6-18802  1/1994  Japan .

*Primary Examiner*—Mark J. Reinhart
*Attorney, Agent, or Firm*—Oblon, Spivak, McClelland, Maier & Neustadt, P.C.

[57]  ABSTRACT

A multi-beam optical system includes: a light beam generating part for generating a plurality of light beams using a plurality of light-emitting parts which are offset from each other in the sub-scanning direction and which are individually controllable; a coupling optical part for transmitting said plurality of light beams generated by said light beam generating part; an aperture part for defining said plurality of light beams, respectively; a beam combiner part for combining said plurality of light beams; a first image forming part for forming images of said plurality of light beams passing through said coupling optical part; a deflector part for deflecting said plurality of light beams output from said first image forming part, the images of said plurality of light beams being formed in a vicinity of said deflector part; and a second image forming part for forming images of said plurality of light beams deflected by said deflector part, wherein an exit pupil is in a conjugated arrangement with said second image forming part in a sub-scanning direction, and said exit pupil is defined by pre-first-image-forming-part optics.

22 Claims, 7 Drawing Sheets

MULTI-BEAM WRITE OPTICAL SYSTEM

BACKGROUND OF THE INVENTION

1. Field of the Invention

The present invention generally relates to multi-beam optical scanning apparatuses for scanning a surface with a plurality of lines simultaneously and more particularly, to an improved multi-beam scanning apparatus for use in image forming devices such as a laser printer, a laser-scanning measurement device or a display device.

2. Description of the Related Art

Multi-beam scanning as used, for example, in present-day image forming devices is an art whereby a plurality of light beams subject to individual optical modulation are used to simultaneously scan a surface such as a photosensitive body. In a multi-beam scanning apparatus, the quality of created images is degraded if the pitch between the plurality of scanning beams in the sub-scanning direction is irregular. Various technologies for correcting the irregularity have been proposed.

U.S. Pat. No. 5,512,949 entitled "MULTIPLE BEAM RASTER OUTPUT SCANNER OPTICAL SYSTEM HAVING TELECENTRIC CHIEF EXIT RAYS" proposes one such technology. According to the invention described in U.S. Pat. No. 5,512,949, a pair of laser diodes are vertically aligned and sagittally (in the sub-scanning direction) offset by 25 microns. Two light beams emitted by the pair of light diodes are simultaneously reflected by the same polygon facet surface of a rotating polygon (deflector). The laser beams from the deflector to a scanned surface is substantially parallel to an system axis. That is, the chief exit rays are telecentric.

Japanese Laid-Open-Patent Application No. 6-18802 entitled "OPTICAL SCANNING DEVICE" proposes another technology used in a multi-beam scanning apparatus. According to the invention described in Japanese Laid-Open Patent Application No. 6-18802, a plurality of light beams are emitted by light source means having a plurality of light-emitting parts arranged in a sub-scanning direction. Images of the plurality of light beams emitted by the light source means and transmitted through an aperture are formed on a deflector by an anamorphic optic having a power in a sub-scanning direction. The light beams deflected by the deflector are then directed to an image forming optic so as to scan a surface simultaneously. The anamorphic optic is constructed so as to place the aperture and the image forming optic in a conjugated arrangement in a sagittal section such that the size of an image formed at the aperture is identical to or smaller than the size of an image formed at the image forming optic. Thus, the light beam emitted by the light-emitting part offset from the system axis is designed to cross the system axis when entering the image forming optic.

In U.S. Pat. No. 5,512,949, a sagittal offset of a scan line from an ideal line is referred to as a scan line bow. The sagittal offset itself is caused by various errors in fitting system components to the system and by the facet inclination of a rotating polygon. In the same reference, the phenomenon of different sagittal offsets of scan lines is referred to as differential scan line bow. Hereinafter, differential scan line bow will be referred to as scan line pitch deviation. The scan line pitch deviation becomes great when the chief exit rays to the scanned surface are not parallel with the system axis and when the angle (angular deviation, as referred to in U.S. Pat. No. 5,512,949) formed by the chief exit rays with respect to the system axis is great. When the interlace factor of, for example, 3 is employed, the angular deviation becomes significantly greater than when the multiple beams describe adjacent scan lines simultaneously, that is, when in-pitch scanning is performed, resulting in a large differential scan line bow. U.S. Pat. No. 5,512,949 resolves such a shortcoming by providing for a telecentric (that is, telecentric with respect the sub-scanning direction) optical arrangement in which the chief exit rays to the scanned surface are substantially parallel with the system axis.

However, the telecentric optical arrangement causes the size of the system to be relatively large. More specifically, in order for the chief exit rays to be telecentric, the input cylindrical lens and the aperture should be spaced apart by a significant distance so that the two beams cross each other at the object focal point (the focal point toward the light source) of the exit optical element. Stated otherwise, a conjugate point of the aperture has to be produced in front of the exit optical element in a sagittal section. Such an arrangement causes the scale of the scanning system, particularly the optical system including the light source, to be unfavorably large. Reduction in the distance between the input cylindrical lens and the aperture may be attained by increasing the power of the input cylindrical lens. However, the power may be increased only to a certain degree in order to prevent the aberration from becoming unfavorably large. Therefore, reduction in the size of a scanning system is difficult according to U.S. Pat. No. 5,512,949. Moreover, the interlace scanning as described in the same reference has a disadvantage of causing image data processing to be complex.

Japanese Laid-Open Patent Application No. 6-18802 calls for a conjugated arrangement of the aperture and the image forming optic so that the system disclosed therein can be applied to limited types of optical systems. More specifically, it cannot be applied to a system where the aperture and the exit pupil do not coincide. Japanese Laid-Open Patent Application No. 6-18802 lacks design flexibility in that, since the aperture should be fixed at a focal point of the collimator lens, it is impossible to adjust a relative position of the conjugate point of the aperture.

In one conceivable approach to improve the design flexibility, a plurality of semiconductor laser diodes may be coupled to a single coupling lens for combining the beams produced by the plurality of semiconductor laser diodes. By adjusting the relative position of the semiconductor laser diodes, it may be possible to adjust the position of the exit pupil and, consequently, the position of the conjugate point of the exit pupil. In such an arrangement, the two beams from the laser diodes enter the coupling lens with a separation of, for example, 6 mm. Assuming that the coupling lens has a focal length of 20 mm, the two beams pass through the focal point with a separation angle of 8.5°, far too wide a separation to obtain a necessary level of scanning pitch on a scanned surface.

SUMMARY OF THE INVENTION

Accordingly, an object of the present invention is to provide a multi-beam optical system in which the aforementioned disadvantages are eliminated.

Another and more specific object of the present invention is to provide a multi-beam optical system in which scan line bows and scan line pitch deviation occurring on a scanned surface struck by a plurality of light beams are reduced to a sufficiently small degree to produce an satisfactory level of image reproduction, without causing the scale of the multi-beam optical system to be unfavorably large.

In view of the fact that the level of scan line pitch deviation largely depends on a facet inclination correction optical element, the present invention has another object of providing a multi-beam optical system in which scan line pitch deviation is reduced by decreasing a sagittal offset between a plurality of light beams passing through the facet inclination correction optical element.

Another object of the present invention is to provide a multi-beam optical system in which the size of the optical system is reduced as compared to the system of U.S. Pat. No. 5,512,949, by causing a plurality of light beams to cross each other behind an object focal point of a facet inclination correction optical element (exit optical element).

Still another object of the present invention is to provide a multi-beam optical system in which the position of an exit pupil formed by optics in front of (that is, toward the light source) the cylindrical lens is controlled without changing a axial separation between the light source and cylindrical lens so that the scale of the optical system can be reduced, by controlling a sagittal displacement between coupling lenses and that of light emitting parts independently of each other.

Yet another object of the present invention is to provide a multi-beam optical system in which an angle formed between each exiting beam and the system axis in the sub-scanning direction is smaller than the corresponding angle in the interlace scanning system, and in which scan line pitch deviation due to variances in the optical system is satisfactorily reduced, by causing a plurality of beams to describe scan lines that are adjacent to each other in a sub-scanning direction.

The aforementioned objects can be achieved by a multi-beam optical system for causing a plurality of light beams offset from each other in a sub-scanning direction to simultaneously scan a scanned surface in a main scanning direction, comprising: light beam generating means for generating a plurality of light beams using a plurality of light-emitting parts which are offset from each other in the sub-scanning direction and which are individually controllable; coupling optical means for transmitting said plurality of light beams generated by said light beam generating means; aperture means for defining said plurality of light beams, respectively; beam combiner means for combining said plurality of light beams; first image forming means for forming images of said plurality of light beams passing through said coupling optical means; deflector means for deflecting said plurality of light beams output from said first image forming means, the images of said plurality of light beams being formed in a vicinity of said deflector means; and second image forming means for forming images of said plurality of light beams deflected by said deflector means, wherein an exit pupil is in a conjugated arrangement with said second image forming means in a sub-scanning direction, and said exit pupil is defined by pre-first-image-forming-means optics.

According to the multi-beam optical system of the present invention, a plurality of light beams are made to pass a second image forming optic with a small separation in a sagittal section than the corresponding angle in the interlace scanning system so that the level of scan line pitch deviation, which level largely depends on the second image forming optic, can be reduced.

The aforementioned objects can also be achieved by a multi-beam optical system for causing a plurality of light beams offset from each other in a sub-scanning direction to simultaneously scan a scanned surface in a main scanning direction, comprising: light beam generating means for generating a plurality of light beams using a plurality of light-emitting parts which are offset from each other in the sub-scanning direction and which are individually controllable; coupling optical means for transmitting said plurality of light beams generated by said light beam generating means; aperture means for defining said plurality of light beams, respectively; beam combiner means for combining said plurality of light beams; first image forming means for forming images of said plurality of light beams passing through said coupling optical means in a sub-scanning direction; deflector means for deflecting said plurality of light beams output from said first image forming means, the images of said plurality of light beams being formed in a vicinity of said deflector means; and second image forming means for forming images of said plurality of light beams deflected by said deflector means, said second image forming means comprising a linear optical element providing a linear scanning performance in the main scanning direction, and a facet inclination correction optical element which places said deflector means and the scanned surface in a conjugated arrangement in cooperation with the linear optical element, wherein a first point is in a conjugated arrangement with a second point, said first point is an exit pupil defined by pre-first-image-forming-means optics, and said second point is located such that the relation $$S_C < S_B < 0$$

obtains, where $S_C$ is a distance from the scanned surface to an object focal point of the facet inclination correction optical element in the sub-scanning section, $S_B$ is a distance from the scanned surface to said second point.

The second point may be located such that the relation $$f/2 \leq S_b \leq -f/2$$

obtains, where f is a focal length of the facet inclination correction optical element, and $S_b$ is a distance from a center of the facet inclination correction optical element to said second point, assuming that the center of the facet inclination correction optical element is an origin.

According to this aspect of the present invention, a plurality of light beams are made to cross each other in the vicinity of a facet inclination correction optical element which is largely responsible for scan line pitch deviation. This arrangement ensures that the multiple light beams pass the facet inclination correction optical element with a small separation in a sagittal section so that the scan line pitch deviation can be reduced. An exit pupil, which is formed by optics in front of the first image forming optic and which is in a conjugated arrangement with a crossing point of the multiple beams, can be shifted toward the first image forming optic so that the scale of the optical system can be prevented from becoming unfavorably large.

By using a reflecting image forming element as a linear optical element, an added benefit is provided in that unfavorable phenomena such as scan pitch line deviation and misregistration due to a difference between wavelengths of multiple light sources (for example, semiconductor lasers) can be reduced.

The coupling optical means may comprise: a plurality of coupling optical elements which correspond to a plurality of light-emitting parts, respectively, for imaging a plurality of light beams from said plurality of light-emitting parts, respectively, at a predetermined optical system, optical axes of said plurality of coupling optical elements being offset from each other in a sub-scanning direction when viewed from an exit side, and at least one of said plurality of light-emitting parts being offset from an optical axis of the corresponding coupling optical element in a direction perpendicular to said optical axis.

According to this aspect of the present invention, it is possible to establish a conjugate point with respect to the exit pupil formed by the optics in front of the cylindrical lens at any desired point in the optical system, without modifying the optics behind the cylindrical lens at all. Therefore, an unfavorable increase in the scale of the optical system can be prevented.

In still further accordance with the present invention, the plurality of light beams are caused to describe adjacent scan lines on a scanned surface which lines are adjacent in a sub-scanning direction.

According to this aspect of the present invention, an angle formed by the multiple beams is smaller than in interlaced scanning. Accordingly, scan line pitch deviation due to variances in the optical system can be reduced as compared to interlaced scanning.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1A:
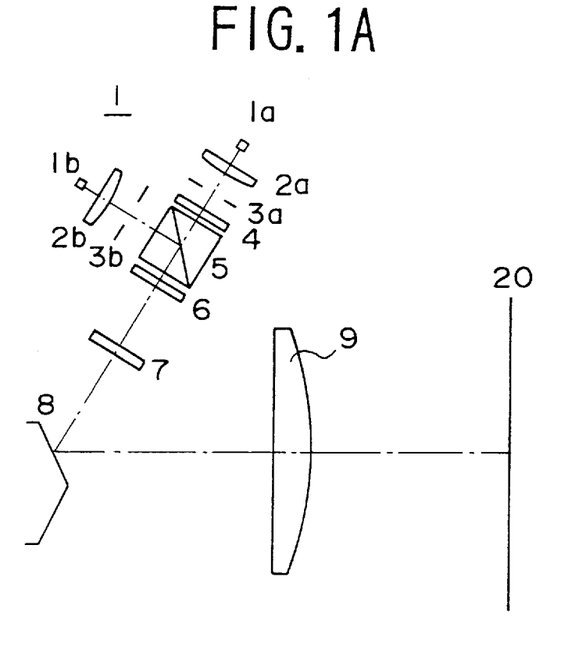
FIG. 1A is a tangential section of a multi-beam optical system according to a first embodiment of the present invention.
Figure 1B:
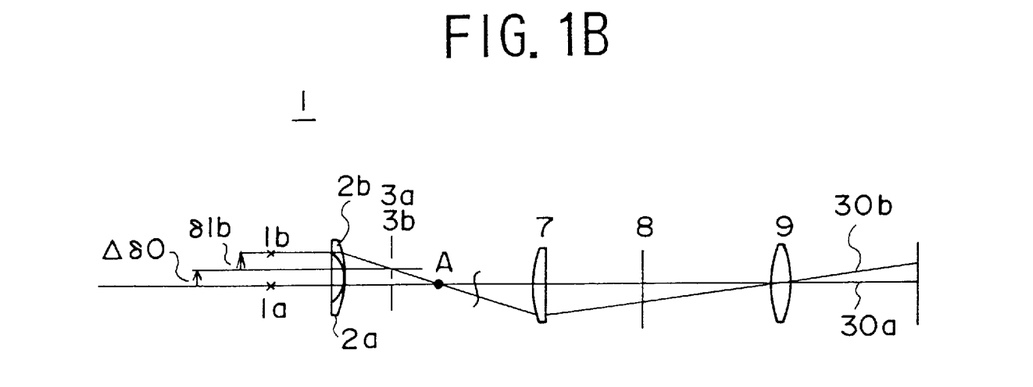
FIG. 1B is a sagittal section of a multi-beam optical system according to the first embodiment.

FIGS. 1A and 1B show a multi-beam optical system 1 according to a first embodiment of the present invention. FIG. 1A is a tangential section of the multi-beam optical system 1; and FIG. 1B is a sagittal section thereof.

It is assumed that two light beams are used in the multi-beam optical system 1. However, any number of light beams may be used in the multi-beam optical systems of the present invention.

Referring to FIG. 1A, the multi-beam optical system comprises two light-emitting parts 1a and 1b, coupling lenses 2a and 2b, apertures 3a and 3b, a halfwave plate 4, a beam combiner 5 such as a polarizing prism, a quarter-wave plate 6, a first image forming optic 7, a deflector 8 and a second image forming optic 9. The first image forming optic 7 is embodied by a cylindrical lens and the second image forming optic 9 is embodied by an anamorphic lens. Hereinafter, the numeral 7 will be broadly used to indicate the first image forming optic and also any elements constituting the same; and the numerals 9 and 10 will be used to indicate the second image forming optic and also any elements constituting the same. Each of the light-emitting parts 1a and 1b is implemented by a semiconductor laser having a s-polarization (polarization in a direction perpendicular to the plane of the paper). The apertures 3a and 3b are provided at the focal points of the coupling lenses 2a and 2b, respectively, so as to define the diameter of light beams emitted by the light-emitting parts 1a and 1b, respectively. The halfwave plate 4 converts the s-polarized light beam from the light emitting part 1a into a p-polarized light beam. The p-polarized beam passing through the halfwave plate 4 is incident on the polarizing prism 5. The light beam from the light-emitting part 1b is incident on the polarizing prism 5 via the aperture 3b. The polarizing prism 5 transmits the p-polarized light beam and reflects the s-polarized light beam. Accordingly, the light beams from the light-emitting parts 1a and 1b are synthesized at the polarizing prism 5.

The quarter-wave plate 6 is provided at the exit of the polarizing prism 5. The quarter-wave plate 6 converts the p-polarized light beam and the s-polarized light beam into a circularly polarized light beam so as to provide the same reflectivity and transmittance to the light beam emitted by the light-emitting parts 1a and 1b. The cylindrical lens 7 is provided on an optical path of the two light beams exiting the quarter-wave plate 6 so as to image the two light beams near the deflector 8, with a small separation between the two light beams in the sub-scanning direction at the reflecting surface of the deflector 8. The deflector 8 is implemented by a polygon mirror. The anamorphic lens 9 provides linear scanning performance in the main scanning direction and facet inclination correction in the sub-scanning direction.

In the light source of the multi-beam optical system 1, the optical axis of the coupling lens 2b is displaced by a pitch Δso from the optical axis of the coupling lens 2a in the sub-scanning direction. A necessary scan line pitch is created at a scanned surface 20 by displacing the light-emitting part 1b from the optical axis of the coupling lens 2b by a pitch δ1b in the sub-scanning direction.

By controlling a sagittal displacement between the coupling lenses 2a and 2b and that of the light-emitting parts 1a and 1b independently of each other, the position of the synthetic exit pupil A formed by the optics in front of the cylindrical lens can be controlled without changing an axial separation between the light source and the cylindrical lens 7. Therefore, the size of the optical system is reduced as compared to the system of U.S. Pat. No. 5,512,949. It is to be appreciated that size reduction can be achieved by putting the synthetic exit pupil A in a conjugated arrangement and cannot be achieved by putting the aperture 3a or the aperture 3b in a conjugated arrangement.

Referring to FIG. 1B, the cylindrical lens 7 is configured so that the synthetic exit pupil A and the anamorphic lens 9 are substantially in a conjugated arrangement in a sagittal section. As a result, the two beams pass the anamorphic lens 9 with a small separation from each other in a sagittal section. Since the anamorphic lens 9 provides a facet inclination correction and largely affects the level of scan line pitch deviation, the arrangement shown FIG. 1B ensures that the scan line pitch deviation occurring at the scanned surface is satisfactory small.

Figure 2A:
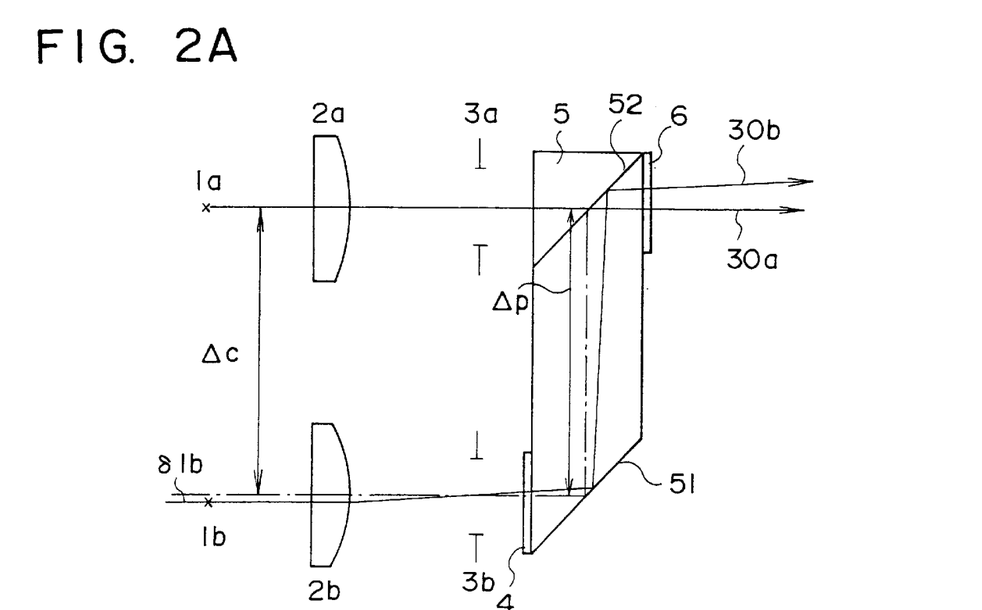
FIG. 2A is a sagittal section of a conceivable coupling optical system.
Figure 2B:
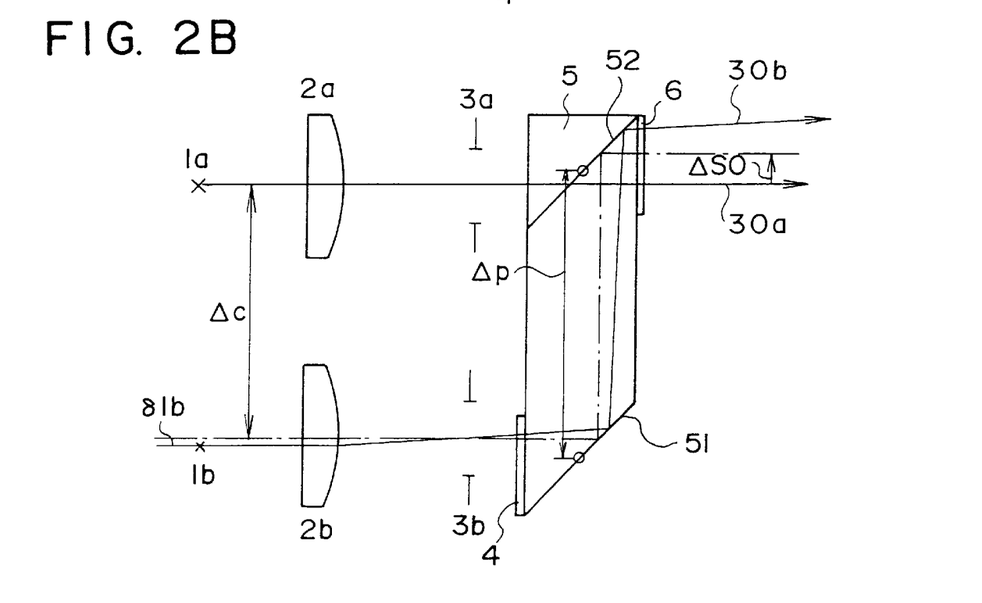
FIGS. 2B, 2C and 2D are sagittal sections of a coupling optical system according to the present invention.
Figure 2C:
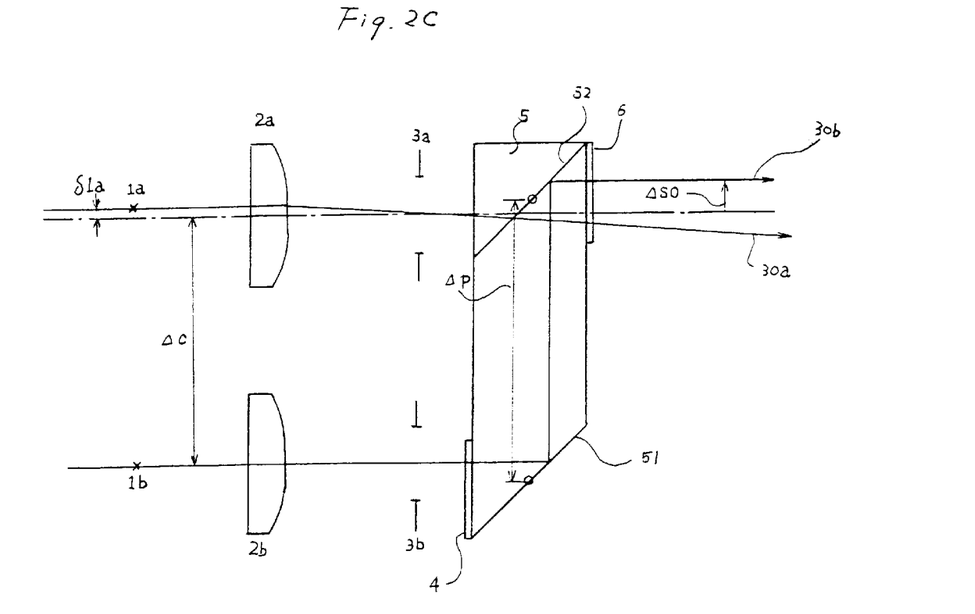
Figure 2D:
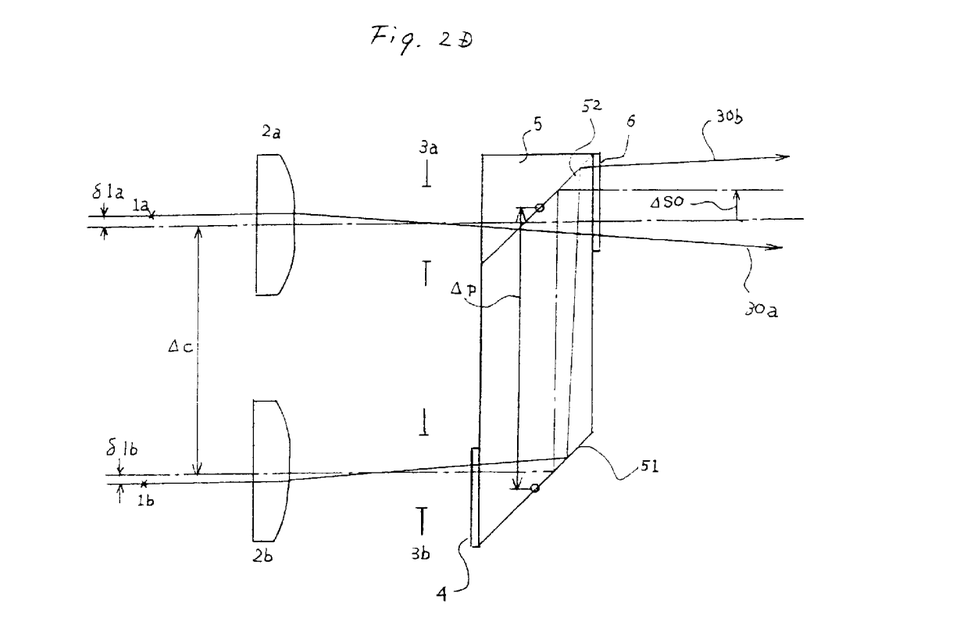
Figure 3A:
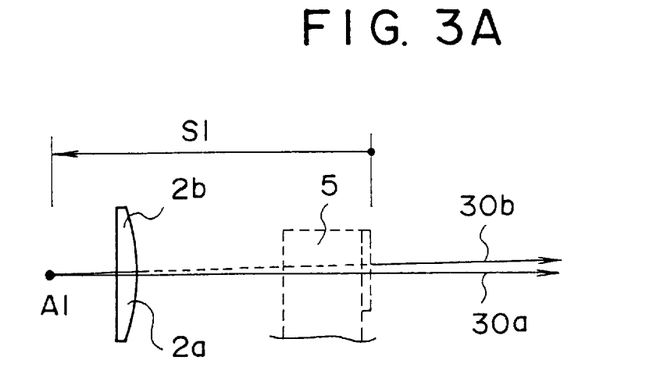
FIG. 3A is a schematic sagittal section of the conceivable coupling optical system.
Figure 3B:
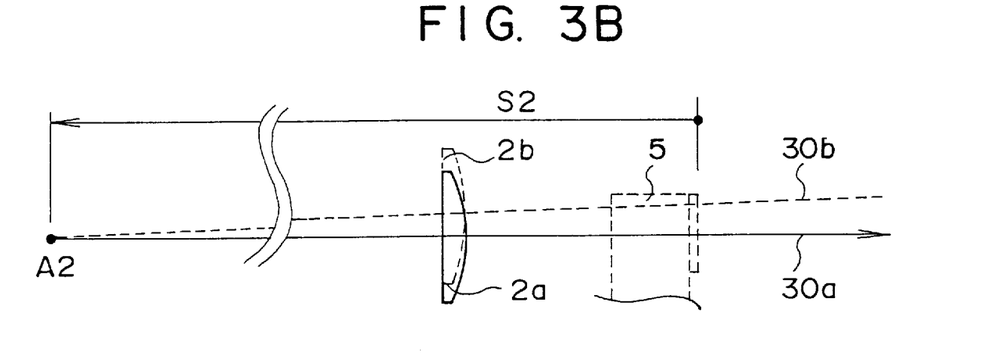
FIG. 3B is a schematic sagittal section of the coupling optical system according to the present invention.

FIGS. 2A, 2B, 2C, 2D, 3A and 3B show coupling optical systems in which light beams emitted by light-emitting parts are incident on respective coupling lenses. FIGS. 2A, 2B, 2C and 2D are sagittal sections, and FIGS. 3A and 3B are schematic sagittal sections.

More specifically, FIGS. 2A and 3A show a conceivable arrangement; and FIGS. 2B, 2C, 2D and 3B show a preferred arrangement according to the present invention.

In FIGS. 2A, 2B, 2C and 2D, those components that are the same as the components of FIGS. 1A and 1B are designated by the same reference numerals. The semiconductor lasers constituting the light-emitting parts 1a and 1b are set to p-polarization. The half-wave plate 4 converts the p-polarized light beam from the light-emitting part 1b into an s-polarized light beam. The polarizing prism 5 has a reflecting mirror surface 51 and a polarizing reflecting surface 52. The reflecting mirror surface 51 reflects the light beam incident on the polarizing prism 5 via the halfwave plate 4 to the polarizing reflecting surface 52. Therefore, the light beams from the light-emitting parts 1a and 1b are synthesized at the polarizing prism 5. The quarter-wave plate 6 is provided at the exit of the polarizing prism 5 so as to convert the p-polarized light beam and the s-polarized light beam into a circularly polarized light beam.

FIG. 2A shows an arrangement of the coupling optical system in which a pitch Δp between reflecting surfaces of the prism 5 coincides with a pitch Δc between the optical axes of the coupling lenses, and the 1 displaced by a pitch δ1b from the optical axis of the associated coupling lens 2b. As shown in the schematic sagittal section of FIG. 3A, when the coupling optical system in this arrangement is looked at from the exit, the two coupling lenses 2a and 2b appear to be located in the same position. Two exit rays 30a and 30b from the light-emitting parts 1a and 1b, respectively, have a separation in the sub-scanning direction. When looked at from the exit, a synthetic exit pupil A1 at which the two exit rays 30a and 30b cross each other is located at a distance S1 from the end face of the quarter-wave plate 6 constituting the coupling optical system toward the light-emitting parts 1a and 1b.

FIGS. 2B shows an arrangement of the coupling optical system according to the present invention. In the arrangement of FIGS. 2B, the pitch Δp between the two reflecting surfaces of the polarizing prism 5 and the pitch Δc between the optical axes of the coupling lenses 2a and 2b do not coincide. Referring to FIG. 3B, when the coupling optical system of FIG. 2B is looked at from the exit, the two coupling lenses 2a and 2b appear to be offset from each other by the pitch _so. The light-emitting part 1b is displaced from the optical axis of the associated coupling lens 2b by the pitch δ1b. The pitch δ1b defines a sagittal separation between the exit rays 30a and 30b. Referring to FIG. 3B again, when looked at from the exit, a synthetic exit pupil A2 at which the exit rays 30a and 30b cross each other is located at a distance S2 from the end face of the coupling optical system toward the light-emitting parts 1a and 1b.

Referring to FIGS. 3A and 3B, |S2|>|S1|. That is, the synthetic exit pupil A2 in the arrangement shown in FIGS. 2B and 3B is farther from the coupling optical system than the synthetic exit pupil A1 of the arrangement shown in FIGS. 2A and 3A. This shows that the position of the synthetic exit pupil can be determined by independently controlling a sagittal displacement between the optical axes of the coupling lenses 2a and 2b and a sagittal displacement between the light-emitting parts 1a and 1b and the optical axes of the coupling lenses 2a and 2b, respectively.

Accordingly, by using the coupling optical system as shown in FIGS. 2B and 3B, it is possible to establish a conjugate point with respect to the exit pupil formed by the optics in front of the cylindrical lens at any desired point in the optical system, without modifying the optics behind the cylindrical lens at all.

As shown in FIG. 3C, the light-emitting part 1a may be displaced from the optical axis of the associated coupling lens 2a by a pitch δ1a, while the light-emitting part 1b is made to remain on the optical axis of the associated coupling lens 2b.

Referring to FIG. 3D, both the light-emitting parts 1a and 1b may be displaced from the respective optical axes.

Figure 4A:
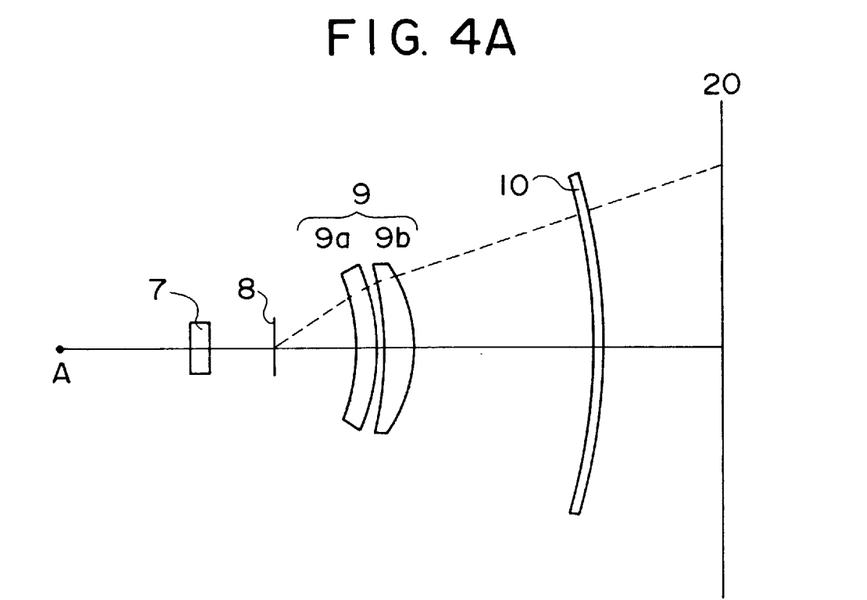
FIG. 4A is a tangential section of a multi-beam optical system according to a second embodiment of the present invention.
Figure 4B:
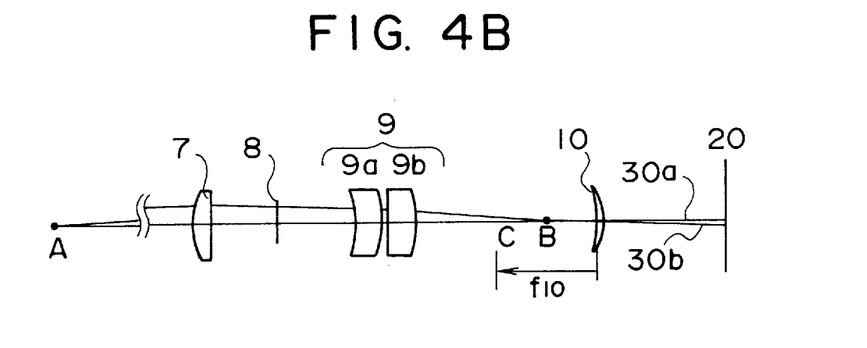
FIGS. 4B and C are sagittal sections of the multi-beam optical system according to the second embodiment.
Figure 4C:
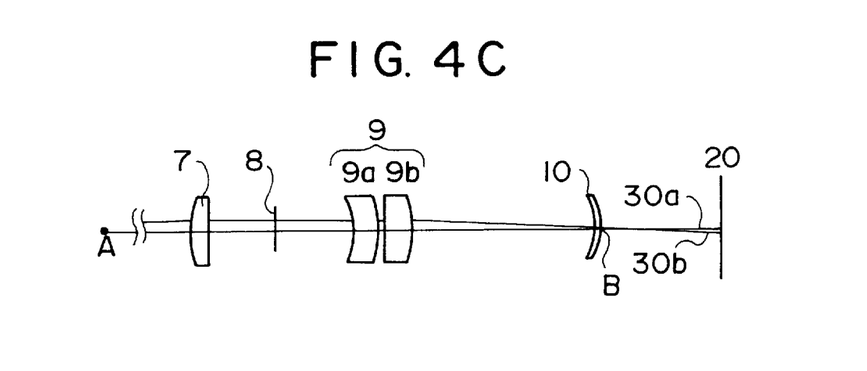

FIGS. 4A–4C show a multi-beam optical system according to a second embodiment. FIG. 4A is a tangential section of the multi-beam optical system according to the second embodiment; and FIGS. 4B and 4C are sagittal sections thereof. The light source is constructed in the same manner as the light source already described, and the description thereof is omitted. In the following description, the multi-beam optical system using two beams is assumed.

The cylindrical lens 7 constitutes the first image forming optic for imaging the two light beams in the vicinity of the deflector 8 embodied by a rotating polygon. The second image forming optic for imaging the two light beams deflected by the deflector 8 on the scanned surface 20 is constructed of an fθ lens complex 9 and an elongated toroidal lens 10. The fθ lens 9 is a linear optical element providing linear scanning performance in the main scanning direction. The elongated toroidal lens 10 operates as a facet inclination correction optical element. In cooperation with the fθ lens complex 9, the elongated toroidal lens 10 puts the deflector 8 and the scanned surface 20 substantially in a conjugated arrangement in a sagittal section. The fθ lens complex 9 comprises two lenses 9a and 9b.

In the arrangement shown in FIG. 4B, a conjugate point B of the exit pupil A formed by the optics in front of (that is, toward the light source) the cylindrical lens 7 is located between the object focal point C of the elongated toroidal lens 10 and the elongated toroidal lens 10. As a result, the exit rays 30a and 30b from the elongated toroidal lens 10 are not telecentric in a sagittal section but have a certain separation. However, it is to be appreciated that the multiple beams according to the arrangement of FIG. 4B cross each other at a point nearer the elongated toroidal lens 10 (the facet inclination correction optical element) than the beams according to U.S. Pat. No. 5,512,949 which cross each other at the object focal point of the facet inclination correction optical element.

Bearing in mind that the facet inclination correction optical element affects scan line pitch deviation to a greater degree than any other optical elements in the system, the obvious advantage of such an arrangement is that the multiple beams pass through the elongated toroidal lens 10 with a smaller separation in a sagittal section than the beams according to U.S. Pat. No. 5,512,949, so that the scan line pitch deviation is reduced. In order to ensure that the scan line pitch deviation is smaller than that produced by the arrangement of U.S. Pat. No. 5,512,949, the multiple beams preferably cross each other at a position behind the midpoint of the focal length. That is, assuming that the elongated toroidal lens 10 has a focal length of f10, the multiple beams preferably cross at a distance ±f10/2 from the elongated toroidal lens 10. FIG. 4C shows one such preferable arrangement in which the exit pupil A formed by the optics in front of the cylindrical lens is nearer the cylindrical lens 7 than in the arrangement shown in FIG. 4B. Thus, the conjugate point B of the exit pupil A is located in the elongated toroidal lens 10.

Even when the conjugate point B of the exit pupil A is shifted away from the toroidal lens 10 beyond the f10/2 position so as to be nearer the scanned surface 20, the scan line pitch deviation can be controlled within an acceptable range ensuring a satisfactory level of image reproduction, on the condition that scan lines striking the scanned surface are sufficiently close to each other.

Figure 5:
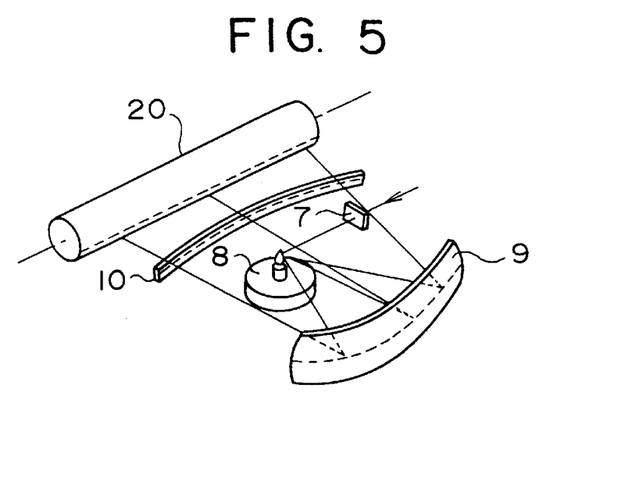
FIG. 5 is a perspective view of a multi-beam optical system according to a third embodiment of the present invention.
Figure 6A:
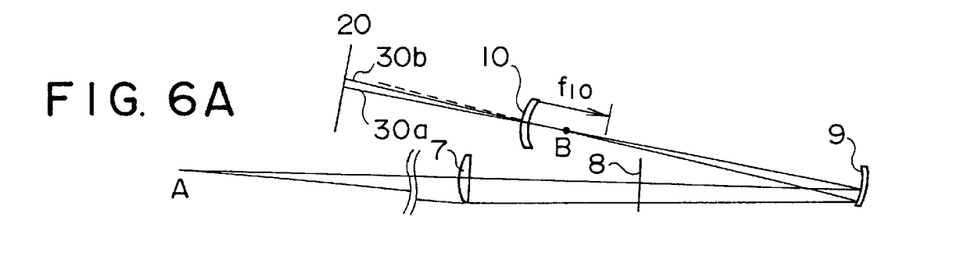
FIGS. 6A, 6B and 6C are sagittal sections of the multi-beam optical system according to the third embodiment.
Figure 6B:
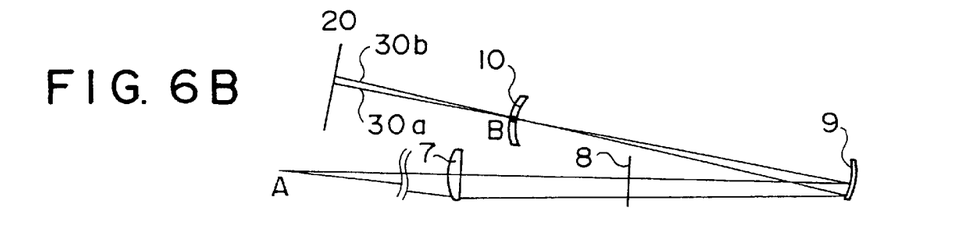
Figure 6C:
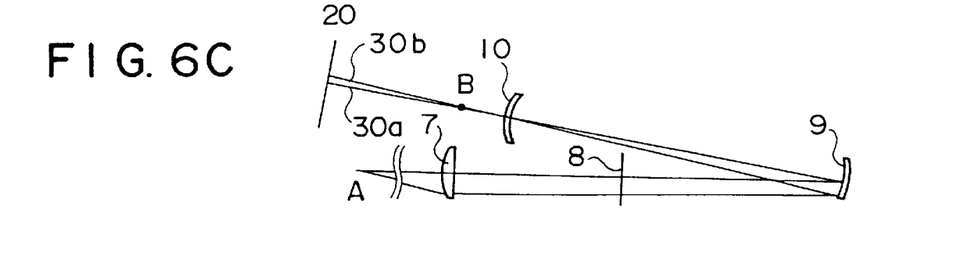

FIGS. 5 and 6A–6C show a multi-beam optical system according to a third embodiment of the present invention. FIG. 5 is a perspective view of the multi-beam optical system according to the third embodiment; and FIGS. 6A–6C are sagittal sections thereof. The light source employed in the third embodiment is the same as the light source described already. In the following description, the multi-beam optical system using two light beams is assumed.

The multi-beam optical system according to the third embodiment comprises the cylindrical lens 7, the deflector 8, an fθ mirror 9 (reflecting image forming element) and an elongated toroidal lens 10. The cylindrical lens 7 embodies the first image forming optic for imaging the two beams in the vicinity of the deflector in a sagittal section. The deflector 8 is embodied by a rotating polygon. The fθ mirror is a linear optical element providing linear scanning performance in the main scanning direction. In cooperation with the fθ mirror 9, the elongated toroidal lens 10 puts the deflector 8 and the scanned surface 20 substantially in a conjugated arrangement in a sagittal section. The fθ mirror 9 and the elongated toroidal lens 10 constitute the second image forming optic for imaging the two beams deflected by the deflector in the scanned surface 20.

As the exit pupil A formed by the optics in front of the cylindrical lens is successively shifted toward the cylindrical lens 7 as shown in FIGS. 6A, 6B and 6C, the conjugate point B of the exit pupil A is shifted toward the scanned surface 20. Thus, the two beams may be arranged to cross each other at any desired position in the optical system.

One preferable coupling optical system as shown in FIGS. 2B was produced according to the design specification as follows.

| focal length of a coupling lens | 8 mm |
|---|---|
| light-emitting position | focal point of the coupling lens |
| optical axis separation in a sub-scanning direction | Δso = 0.168 mm |
| displacement of the light-emitting part 1b from the optical axis of the coupling lens 2b | δ1b = 0.0063 mm |

Referring to FIG. 3B, the exit pupil A was located at the distance S2=−206.4 mm. The conjugate point B of the exit pupil A was located in the elongated toroidal lens 10 as shown in FIGS. 6B. In-pitch scanning with a scan line pitch of 63.5 μm was performed. While a scan line pitch deviation due to the facet inclination of a rotating polygon was approximately 1.2 μm according to the conventional multi-beam optical system, the system described above reduces the scan line pitch deviation to 0.1 μm. That is, an approximately ¹/₁₀ reduction in the scan line pitch deviation is attained.

Figure 7:
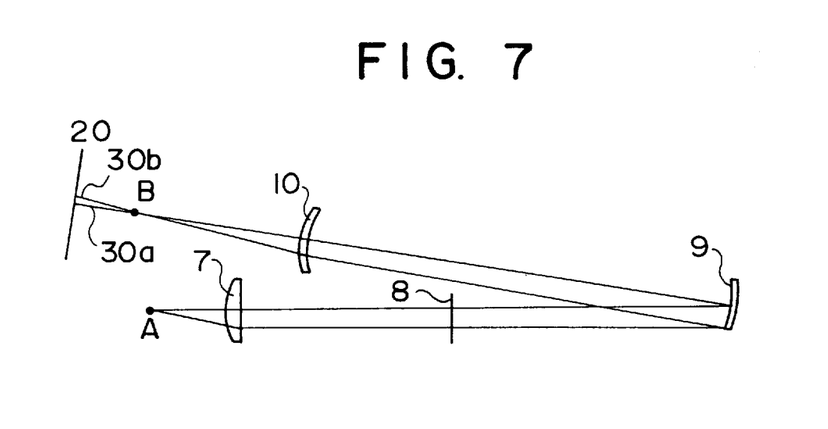
FIG. 7 is a sagittal section of the multi-beam optical system according to the third embodiment.

The conventional system referred to in the above corresponds to the arrangement of FIG. 7 where the conjugate point B is behind the elongated toroidal lens 10 so as to approach the scanned surface 20. While the scan line pitch deviation of 1.2 μm according to the conventional system is within an acceptable range ensuring a satisfactory level of image reproduction, the scan line pitch deviation can be further reduced according to the present invention without increasing the size of the system. Since the arrangements of FIGS. 6A–6C and 8 use a reflecting image forming element (fθ mirror), such unfavorable phenomena such as scan line pitch deviation and misregistration due to a difference between wavelengths of multiple light sources can be reduced.

Figure 8A:
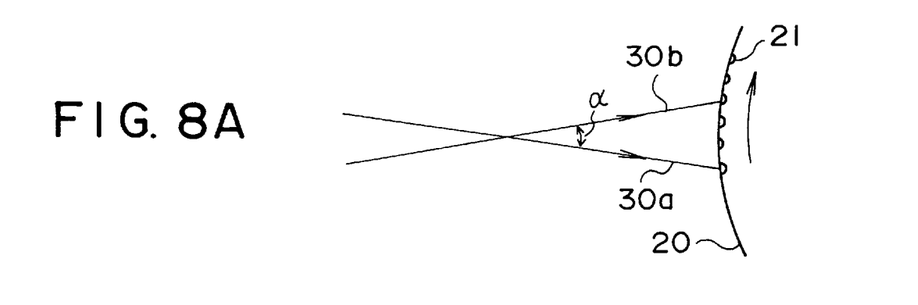
FIGS. 8A and 8B are sagittal sections showing two beams simultaneously striking a scanned surface such as a photosensitive drum.
Figure 8B:
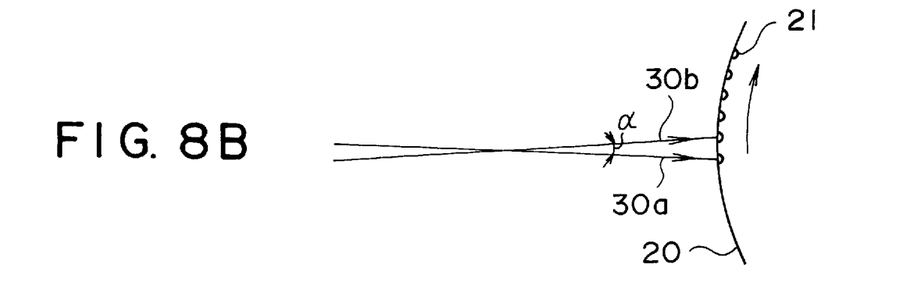

FIGS. 8A and 8B are sagittal sections showing two beams 30a and 30b simultaneously striking a scanned surface 20 such as a photosensitive drum. The numeral 21 indicates an exposed latent image. FIG. 8A shows an arrangement where the interlace factor of 3 is employed as described in U.S. Pat. No. 5,512,949. More specifically, two scan lines reside between the two beams hitting the scanned surface simultaneously. FIG. 8B shows an in-pitch scanning where adjacent lines are described simultaneously. Since in-pitch scanning is employed in the present invention, an angle a formed by the two beams 30a and 30b is smaller than the corresponding angle in interlaced scanning. Accordingly, scan line pitch deviation due to variances in the optical system can be reduced than that produced in interlaced scanning.

The present invention is not limited to the above described embodiments, and variations and modifications may be made without departing from the scope of the present invention.

What is claimed is:

1. A multi-beam optical system for causing a plurality of light beams offset from each other in a sub-scanning direction to simultaneously scan a scanned surface in a main scanning direction, comprising:

light beam generating means for generating a plurality of light beams using a plurality of light-emitting parts which are offset from each other in the sub-scanning direction and which are individually controllable;

coupling optical means for transmitting said plurality of light beams generated by said light beam generating means;

aperture means for defining said plurality of light beams, respectively;

beam combiner means for combining said plurality of light beams;

first image forming means for forming images of said plurality of light beams passing through said coupling optical means;

deflector means for deflecting said plurality of light beams output from said first image forming means, the images of said plurality of light beams being formed in a vicinity of said deflector means; and second image forming means for forming images of said plurality of light beams deflected by said deflector means, wherein an exit pupil is in a conjugated arrangement with said second image forming means in a sub-scanning direction, and said exit pupil is defined by pre-first-image-forming-means optics.

2. A multi-beam optical system for causing a plurality of light beams offset from each other in a sub-scanning direction to simultaneously scan a scanned surface in a main scanning direction, comprising:

light beam generating means for generating a plurality of light beams using a plurality of light-emitting parts which are offset from each other in the sub-scanning direction and which are individually controllable;

coupling optical means for transmitting said plurality of light beams generated by said light beam generating means;

aperture means for defining said plurality of light beams, respectively;

beam combiner means for combining said plurality of light beams;

first image forming means for forming images of said plurality of light beams passing through said coupling optical means in a sub-scanning direction;

deflector means for deflecting said plurality of light beams output from said first image forming means, the images of said plurality of light beams being formed in a vicinity of said deflector means; and second image forming means for forming images of said plurality of light beams deflected by said deflector means, said second image forming means comprising a linear optical element providing a linear scanning performance in the main scanning direction, and a facet inclination correction optical element which places said deflector means and the scanned surface in a conjugated arrangement in cooperation with the linear optical element, wherein a first point is in a conjugated arrangement with a second point, said first point is an exit pupil defined by pre-first-image-forming-means optics, and said second point is located such that the relation $$S_C < S_B < 0$$

obtains, where $S_C$ is a distance from the scanned surface to an object focal point of the facet inclination correction optical element in the sub-scanning section, $S_B$ is a distance from the scanned surface to said second point.

3. A multi-beam optical system for causing a plurality of light beams offset from each other in a sub-scanning direction to simultaneously scan a scanned surface in a main scanning direction, comprising:

light beam generating means for generating a plurality of light beams using a plurality of light-emitting parts which are offset from each other in the sub-scanning direction and which are individually controllable;

coupling optical means for transmitting said plurality of light beams generated by said light beam generating means;

aperture means for defining said plurality of light beams, respectively;

beam combiner means for combining said plurality of light beams;

first image forming means for forming images of said plurality of light beams passing through said coupling optical means in a sub-scanning direction;

deflector means for deflecting said plurality of light beams output from said first image forming means, the images of said plurality of light beams being formed in a vicinity of said deflector means; and second image forming means for forming images of said plurality of light beams deflected by said deflector means, said second image forming means comprising a linear optical element providing a linear scanning performance in the main scanning direction, and a facet inclination correction optical element which places said deflector means and the scanned surface in a conjugated arrangement in cooperation with the linear optical element, wherein a first point is in a conjugated arrangement with a second point, said first point is an exit pupil defined by pre-first-image-forming-means optics, and said second point is located such that the relation $$f/2 \leq S_b \leq -f/2$$

obtains, where f is a focal length of the facet inclination correction optical element, and $S_b$ is a distance from a center of the facet inclination correction optical element to said second point, assuming that the center of the facet inclination correction optical element is an origin.

4. The multi-beam optical system as claimed in claim 1, wherein said coupling optical means comprises:

a plurality of coupling optical elements which correspond to a plurality of light-emitting parts, respectively, for imaging a plurality of light beams from said plurality of light-emitting parts, respectively, at a predetermined optical system, optical axes of said plurality of coupling optical elements being offset from each other in a sub-scanning direction when viewed from an exit side, and at least one of said plurality of light-emitting parts being offset from an optical axis of the corresponding coupling optical element in a direction perpendicular to said optical axis.

5. The multi-beam optical system as claimed in claim 1, wherein said light beam generating means includes first and second light-emitting parts, and said coupling optical means comprises first and second coupling optical elements which correspond to the first and second light-emitting parts, respectively, for imaging first and second light beams from said first and second light-emitting parts, respectively, at a predetermined optical system.

6. The multi-beam optical system as claimed in claim 5, wherein optical axes of said first and second coupling optical elements are offset from each other in a sub-scanning direction when viewed from an exit side, and said first light-emitting part is offset from an optical axis of said first coupling optical element in a direction perpendicular to said optical axis.

7. The multi-beam optical system as claimed in claim 5, wherein optical axes of said first and second coupling optical elements are offset from each other in a sub-scanning direction when viewed from an exit side, and said second light-emitting part is offset from an optical axis of said second coupling optical element in a direction perpendicular to said optical axis.

8. The multi-beam optical system as claimed in claim 5, wherein optical axes of said first and second coupling optical elements are offset from each other in a sub-scanning direction when viewed from an exit side, and said first and second light-emitting parts are offset from an optical axis of each of said first and second coupling optical elements, respectively, in a direction perpendicular to said optical axis.

9. The multi-beam optical system as claimed in claim 1, wherein said plurality of light beams are caused to describe adjacent scan lines on a scanned surface which lines are adjacent in a sub-scanning direction.

10. The multi-beam optical system as claimed in claim 2, wherein said linear optical element is implemented by an fθ lens.

11. The multi-beam optical system as claimed in claim 2, wherein said linear optical element is implemented by a reflecting image forming element.

12. A multi-beam optical system for causing a plurality of light beams offset from each other in a sub-scanning direction to simultaneously scan a scanned surface in a main scanning direction, comprising:

a light beam generating part for generating a plurality of light beams using a plurality of light-emitting parts which are offset from each other in the sub-scanning direction and which are individually controllable;

a coupling optical part for transmitting said plurality of light beams generated by said light beam generating part;

an aperture part for defining said plurality of light beams, respectively;

a beam combiner part for combining said plurality of light beams;

a first image forming part for forming images of said plurality of light beams passing through said coupling optical part;

a deflector part for deflecting said plurality of light beams output from said first image forming part, the images of said plurality of light beams being formed in a vicinity of said deflector part; and second image forming part for forming images of said plurality of light beams deflected by said deflector part, wherein an exit pupil is in a conjugated arrangement with said second image forming part in a sub-scanning direction, and said exit pupil is defined by pre-first-image-forming-part optics.

13. A multi-beam optical system for causing a plurality of light beams offset from each other in a sub-scanning direction to simultaneously scan a scanned surface in a main scanning direction, comprising:

a light beam generating part for generating a plurality of light beams using a plurality of light-emitting parts which are offset from each other in the sub-scanning direction and which are individually controllable;

a coupling optical part for transmitting said plurality of light beams generated by said light beam generating part;

an aperture part for defining said plurality of light beams, respectively;

a beam combiner part for combining said plurality of light beams;

a first image forming part for forming images of said plurality of light beams passing through said coupling optical part in a sub-scanning direction;

a deflector part for deflecting said plurality of light beams output from said first image forming part, the images of said plurality of light beams being formed in a vicinity of said deflector part; and a second image forming part for forming images of said plurality of light beams deflected by said deflector part, said second image forming part comprising a linear optical element providing a linear scanning performance in the main scanning direction, and a facet inclination correction optical element which places said deflector part and the scanned surface in a conjugated arrangement in cooperation with the linear optical element, wherein a first point is in a conjugated arrangement with a second point, said first point is an exit pupil defined by pre-first-image-forming-part optics, and said second point is located such that the relation $$S_C < S_B < 0$$

obtains, where $S_C$ is a distance from the scanned surface to an object focal point of the facet inclination correction optical element in the sub-scanning section, $S_B$ is a distance from the scanned surface to said second point.

14. A multi-beam optical system for causing a plurality of light beams offset from each other in a sub-scanning direction to simultaneously scan a scanned surface in a main scanning direction, comprising:

a light beam generating part for generating a plurality of light beams using a plurality of light-emitting parts which are offset from each other in the sub-scanning direction and which are individually controllable;

a coupling optical part for transmitting said plurality of light beams generated by said light beam generating part;

an aperture part for defining said plurality of light beams, respectively;

a beam combiner part for combining said plurality of light beams;

a first image forming part for forming images of said plurality of light beams passing through said coupling optical part in a sub-scanning direction;

a deflector part for deflecting said plurality of light beams output from said first image forming part, the images of said plurality of light beams being formed in a vicinity of said deflector part; and a second image forming part for forming images of said plurality of light beams deflected by said deflector part, said second image forming part comprising a linear optical element providing a linear scanning performance in the main scanning direction, and a facet inclination correction optical element which places said deflector part and the scanned surface in a conjugated arrangement in cooperation with the linear optical element, wherein a first point is in a conjugated arrangement with a second point, said first point is an exit pupil defined by pre-first-image-forming-part optics, and said second point is located such that the relation $$f/2 \leq S_b \leq -f/2$$

obtains, where f is a focal length of the facet inclination correction optical element, and $S_b$ is a distance from a center of the facet inclination correction optical element to said second point, assuming that the center of the facet inclination correction optical element is an origin.

15. The multi-beam optical system as claimed in claim 12, wherein said coupling optical part comprises:

a plurality of coupling optical elements which correspond to a plurality of light-emitting parts, respectively, for imaging a plurality of light beams from said plurality of light-emitting parts, respectively, at a predetermined optical system, optical axes of said plurality of coupling optical elements being offset from each other in a sub-scanning direction when viewed from an exit side, and at least one of said plurality of light-emitting parts being offset from an optical axis of the corresponding coupling optical element in a direction perpendicular to said optical axis.

16. The multi-beam optical system as claimed in claim 12, wherein said light beam generating part includes first and second light-emitting parts, and said coupling optical part comprises first and second coupling optical elements which correspond to the first and second light-emitting parts, respectively, for imaging first and second light beams from said first and second light-emitting parts, respectively, at a predetermined optical system.

17. The multi-beam optical system as claimed in claim 16, wherein optical axes of said first and second coupling optical elements are offset from each other in a sub-scanning direction when viewed from an exit side, and said first light-emitting part is offset from an optical axis of said first coupling optical element in a direction perpendicular to said optical axis.

18. The multi-beam optical system as claimed in claim 16, wherein optical axes of said first and second coupling optical elements are offset from each other in a sub-scanning direction when viewed from an exit side, and said second light-emitting part is offset from an optical axis of said second coupling optical element in a direction perpendicular to said optical axis.

19. The multi-beam optical system as claimed in claim 16, wherein optical axes of said first and second coupling optical elements are offset from each other in a sub-scanning direction when viewed from an exit side, and said first and second light-emitting parts are offset from an optical axis of each of said first and second coupling optical elements, respectively, in a direction perpendicular to said optical axis.

20. The multi-beam optical system as claimed in claim 12, wherein said plurality of light beams are caused to describe adjacent scan lines on a scanned surface which lines are adjacent in a sub-scanning direction.

21. The multi-beam optical system as claimed in claim 13, wherein said linear optical element is implemented by an f$\theta$ lens.

22. The multi-beam optical system as claimed in claim 13, wherein said linear optical element is implemented by a reflecting image forming element.

* * * * *